(12) United States Patent  (10) Patent No.: US 7,944,654 B2
Scott et al.  (45) Date of Patent: May 17, 2011

(54) MULTIPLE-POLE CIRCUIT BREAKER WITH SHARED CURRENT SENSOR FOR ARCING FAULT DETECTION

(76) Inventors: Gary W. Scott, Mount Vernon, IA (US); Randall J. Gass, Cedar Rapids, IA (US)

( * ) Notice: Subject to any disclaimer, the term of this patent is extended or adjusted under 35 U.S.C. 154(b) by 192 days.

(21) Appl. No.: 12/267,750

(22) Filed: Nov. 10, 2008

(65) Prior Publication Data

US 2010/0118451 A1 May 13, 2010

(51) Int. Cl.
*H02H 3/00* (2006.01)
*H02H 9/08* (2006.01)
(52) U.S. Cl. .............................. 361/47; 361/42; 361/44
(58) Field of Classification Search .................. 361/42
See application file for complete search history.

(56) References Cited

U.S. PATENT DOCUMENTS

| | | | |
|---|---|---|---|
| 4,538,194 A | 8/1985 | Zylstra et al. | |
| 5,889,643 A | 3/1999 | Elms | |
| 6,014,297 A * | 1/2000 | Clarey et al. | 361/42 |
| 7,136,265 B2 | 11/2006 | Wong et al. | |
| 7,149,066 B2 | 12/2006 | Elms et al. | |
| 7,193,827 B2 | 3/2007 | Reid et al. | |
| 7,345,860 B2 | 3/2008 | Wong | |
| 2005/0286184 A1 * | 12/2005 | Campolo | 361/42 |
| 2007/0132531 A1 | 6/2007 | Elms | |

* cited by examiner

*Primary Examiner* — Dharti H Patel

(57) ABSTRACT

A multi-pole circuit breaker for a power distribution system having multiple line conductors carrying AC currents that are out of phase with each other, and a common neutral conductor, comprises first and second current sensors, a ground fault detection circuit, and an arcing fault detection circuit. The first current sensor is adapted to be coupled to both of the line conductors and to the neutral conductor and produces a first output signal indicative of the resultant of the electrical currents flowing in the line and neutral conductors. The ground fault detection circuit receives the first output signal and produces a trip signal in response to the detection of a ground fault. The second current sensor comprises a coil wound on a toroidal core and is adapted to be coupled to both of the line conductors in a manner that the electrical currents in the line conductors flow in opposite directions inside the toroidal core, thus inducing in the coil a second output signal that is a function of the difference of the electrical currents in the line conductors. The arcing fault detection circuit receives the second output signal and includes a processor programmed to analyze the second output signal and produce a trip signal in response to the detection of an arcing fault.

12 Claims, 2 Drawing Sheets

MULTIPLE-POLE CIRCUIT BREAKER WITH SHARED CURRENT SENSOR FOR ARCING FAULT DETECTION

FIELD OF THE INVENTION

The present invention relates to multiple-pole circuit breakers that are capable of detecting both ground faults and arcing faults.

BACKGROUND OF THE INVENTION

Multiple-pole circuit breakers are used when it is necessary or desirable to simultaneously interrupt the flow of electrical current in two or more power conductors. One example is the two-pole circuit breaker that is widely used to comply with requirements that all ungrounded conductors in a multi-wire branch circuit be opened simultaneously. In a 120/240V power circuit, for example, the two line conductors can be connected either to a single 240V load, such as an electric stove, or to two separate 120V loads, and thus the circuit breaker must be capable of opening both line conductors simultaneously. Two-pole circuit breakers capable of detecting both ground faults and arcing faults have been known for some time, but these breakers have generally required separate current sensors for the two line conductors.

SUMMARY OF THE INVENTION

In accordance with one embodiment, a multi-pole circuit breaker for a power distribution system having multiple line conductors carrying AC currents that are out of phase with each other from a source to a load, and a common neutral conductor, comprises first and second current sensors, a ground fault detection circuit, and an arcing fault detection circuit. The first current sensor is adapted to be coupled to both of the line conductors and to the neutral conductor and produces a first output signal indicative of the sum of the electrical currents flowing in the line and neutral conductors from source to load. (The sum of the line and neutral currents is zero in a normal branch circuit except when a ground fault occurs.) The ground fault detection circuit receives the first output signal and produces a trip signal in response to the detection of a ground fault. The second current sensor comprises a coil wound on a hollow core and is adapted to be coupled to both of the line conductors in a manner that the electrical currents in the line conductors flow in opposite directions inside the hollow core, thus inducing in the coil a second output signal that is a function of the difference of the electrical currents in the line conductors. The arcing fault detection circuit receives the second output signal and includes a processor programmed to analyze the second output signal and produce a trip signal in response to the detection of an arcing fault.

In one implementation, the hollow core of the second current sensor has first and second open ends on opposite sides thereof, the load end of a first one of the line conductor segments that pass through the hollow core is located at the first open end, the load end of a second one of the line conductor segments that pass through the hollow core is located at the second open end, the source end of the first line conductor segment is located at the second open end, and the source end of the second line conductor segment is located at the first open end.

One specific application is in a two-pole circuit breaker for use in a three-wire, single-phase, 120V-to-neutral, 240V-line-to-line, AC power distribution system, in which the currents in the two 120-volt lines are 180° out of phase with each other.

The use of a single current sensor for the detection of arcing faults in a multiple-pole circuit breaker reduces the cost of the breaker by reducing the number of components required and also simplifying the assembly operations. The size of the circuit breaker can also be reduced, which leads to further cost reductions and marketing advantages.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The invention may best be understood by reference to the following description taken in conjunction with the accompanying drawing, in which.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
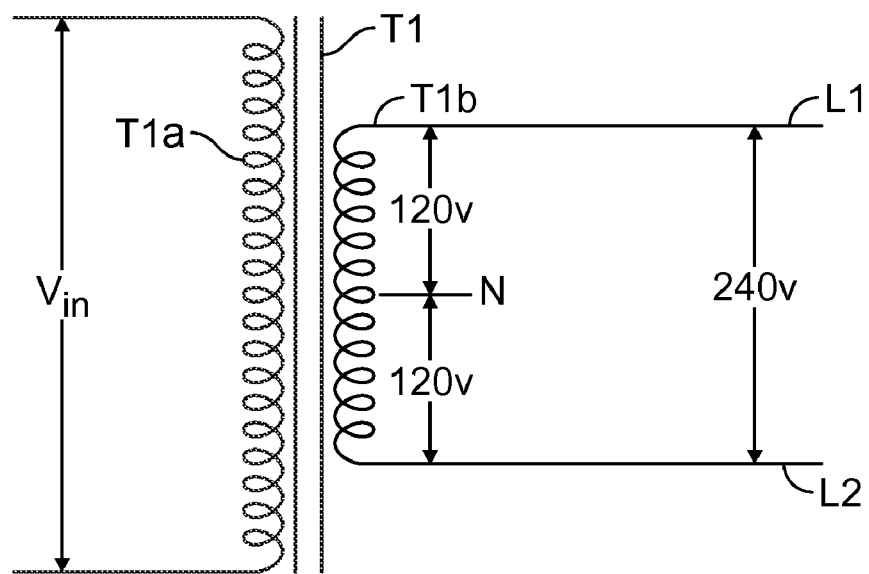
FIG. 1 is a schematic diagram of a power input for a three-wire, single-phase, 120V-to-neutral, 240V-line-to-line, AC power distribution system.

Turning now to the drawings and referring first to FIG. 1, an input voltage $V_{in}$ from a utility transmission line is applied to the primary winding T1$a$ of a step-down transformer T1. The secondary winding T1$b$ has a center tap connected to a grounded neutral line N, and opposite ends of the secondary winding are connected to lines L1 and L2. This arrangement forms a first 120-volt supply across lines L1 and N, a second 120-volt supply across lines L2 and N, and a 240-volt supply across lines L1 and L2, as indicated in FIG. 1. Each of the three supplies is single-phase. These are the three power supplies typically provided to residential and small commercial users of electrical power in the United States.

Figure 2:
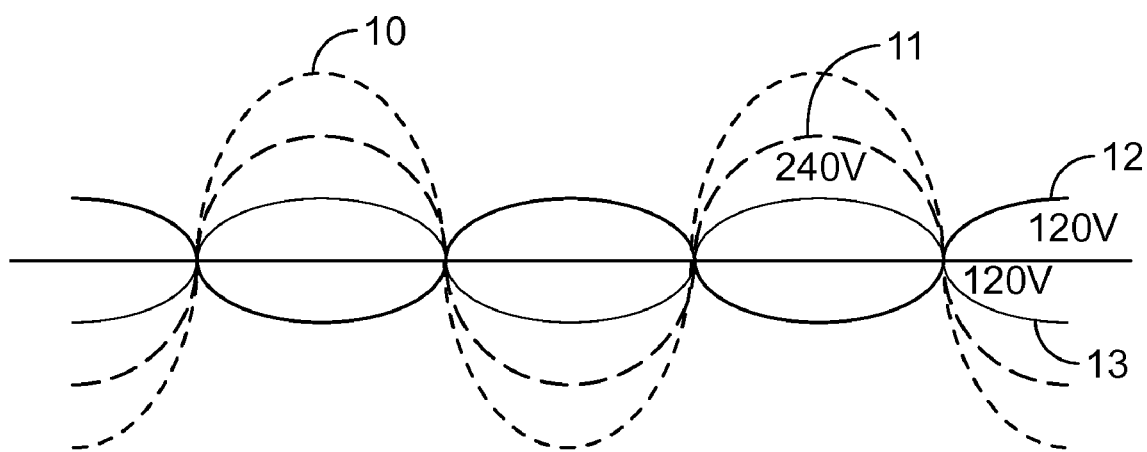
FIG. 2 is a diagram of the theoretical waveforms of the various voltages in the power input of FIG. 1.

FIG. 2 illustrates theoretical waveforms of the various voltages in the power source depicted in FIG. 1. When a sinusoidal waveform 10 is applied to the primary winding T1$a$, the step-down transformer T1 produces a 240-volt sinusoidal waveform 11 across the lines L1 and L2 that is in phase with the waveform 10 of the input voltage $V_{in}$. The two 120-volt waveforms 12 and 13 across L1, N and L2, N are 180° out of phase with each other. The 120-volt waveform 13 is in phase with the $V_{in}$ waveform 10 and the 240-volt waveform 11, and the 120-volt waveform 12 is 180° out of phase with all the waveforms 10, 11 and 13.

Figure 3:
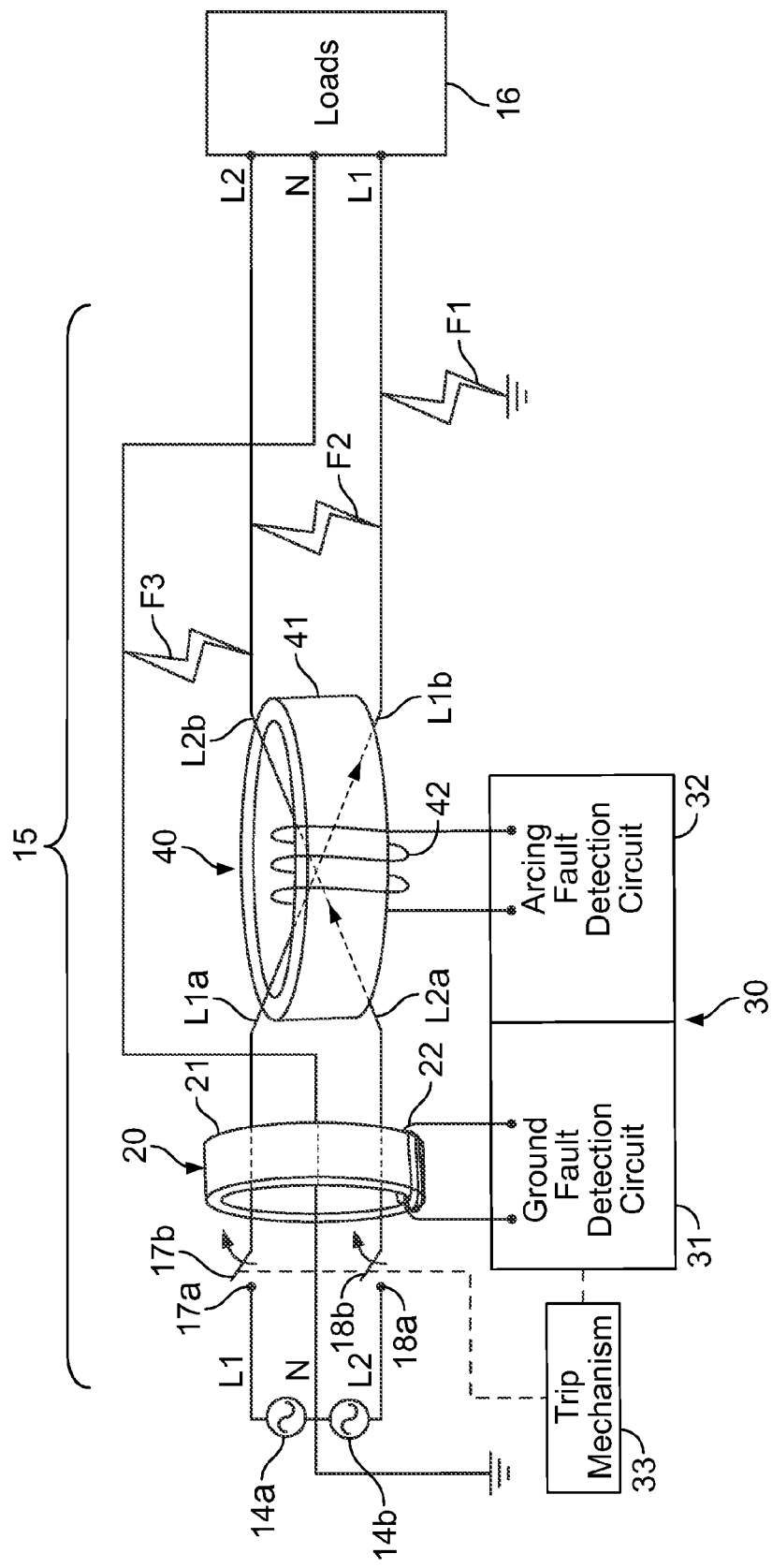
FIG. 3 is a schematic diagram of a three-wire, single-phase, 120V-to-neutral, 240V-line-to-line, AC power distribution system equipped with a dual-pole circuit breaker.

In FIG. 3, the power source described above is represented by a pair of 120-volt power sources 14$a$ and 14$b$, which are connected to one or more electrical loads 16 via the three lines L1, L2 and N. FIG. 3 also illustrates a circuit breaker 15 that is coupled to the lines L1, L2 and N between the sources 14$a$, 14$b$ and the load(s) 16, for opening two pairs of contacts 17$a$, 17b and 18a, 18b when various types of faults are detected in the power circuit. Examples of such faults are ground faults such as the fault F1 from line L2 to ground, parallel arcing faults such as the fault F2 between L1 and L2 and the fault F3 between line L2 and neutral, and series arcing faults that can be caused by a loose connection, a broken conductor or worn insulation in any of the lines.

To detect ground faults in the illustrative system, a first current sensor 20 is coupled to all three of the lines L1, L2 and N. All three conductors L1, L2 and N pass through a toroidal core 21 to form single-turn primary windings on that core. The electrical currents in the three conductors L1, L2 and N induce current flow in a secondary winding 22. In the absence of a ground fault, the net current flow induced in the secondary winding 22 is at or near zero. When a ground fault occurs, however, the net current flow induced in the secondary winding 22 increases to a level that can be detected by a controller 30, as is well known in this art.

As indicated in the drawing, the controller 30 includes both a ground fault detection circuit 31 and an arcing fault detection circuit 32. These two circuits 31 and 32 can share a common processor for analyzing their respective input signals to detect the occurrence of faults.

When a fault condition is detected by either of the detection circuits 31 and 32, the controller 30 produces a trip signal which actuates a trip mechanism 33 that is mechanically coupled to the movable contact in each of the two pairs of contacts 17a, 17b and 18a, 18b, to simultaneously open both lines L1 and L2. The trip mechanism typically includes a solenoid having a movable armature coupled to one or both of the movable contacts, which may be mechanically coupled to each other when the solenoid armature is coupled to only one of the movable contacts. As is conventional in circuit breakers, the movable contacts can also be manually opened, and typically can be closed only by manual operation.

The ground fault detection circuit 31 may be a conventional circuit for generating a trip signal in response to the detection of a ground fault. One example of such a ground fault detection circuit is described in U.S. Patent No. 7,193,827, which is assigned to the assignee of the present invention. The detection circuit described in that patent detects both ground faults and grounded neutrals with only a single current sensor.

To detect arcing faults in the illustrative system, the two lines L1 and L2 are coupled to a second current sensor 40 which includes a core 41 consisting of a magnetic material of low permeability to form a di/dt sensor. The segments of the lines L1 and L2 that pass through the core 41 enter and exit the interior of the core 41 on opposite sides so that the currents flowing in the two conductors L1 and L2 have the same effect on a secondary winding 42 wound on the core 41. Specifically, as illustrated in FIG. 3, the source end L1a of the segment of the conductor L1 passing through the core 41 is at the top of the core 41, and the load end L1b of that segment of the conductor L1 is at the bottom of the core 41. For the conductor L2, the source end L2a of the segment of the conductor L2 passing through the core 41 is at the bottom of the core 41, and the load end L2b of that segment of the conductor L1 is at the top of the core 41.

As mentioned above, the electrical currents in the two line conductors L1 and L2 are 180° out of phase with each other. However, because the out-of-phase currents in the segments of the two lines L1 and L2 within the core 41 flow in opposite directions, they both induce current flow in the same direction in the secondary winding 42. Thus, when a line-to-line arcing fault occurs, the amplitude of the signal induced in the secondary winding 42 is increased by the additive effect of the two line currents within the core 41. The core 41 preferably has a low level of magnetic permeability, so that the signals induced in the secondary winding 42 are di/dt signals, and the final output signal from the secondary winding 42 is the difference of the two di/dt signals induced in that winding by the currents flowing in the segments of the two line conductors L1 and L2 passing through the core 41. A line-to-line arc will generate twice the signal as a line-to-neutral arc. A series arc in a line-to-line load circuit will generate twice the signal as a series arc in a line-to-neutral load circuit.

The di/dt sensor core 41 has a sufficient number of winding turns to allow the sensor and attached filter components to produce a suitable output signal over the specified current range of the breaker. For example, the usable current range in which arcs can be detected may be approximately 3 to 1000 amperes. Ground faults may be detected as low as 5 milliamperes.

In one example, the current sensor 40 is a toroid-type sensor having a magnetic permeability in the range of 10 to 100 mu, with 200 to 1000 turns in the winding 42. Alternative structures for the sensor include multi-part cores and coils that form a single sensor when assembled, and also Hall-effect or similar Giant Magnetic Resistive ("GMR") sensors. An additional configuration for a three-pole arc fault breaker may use two di/dt current sensors instead of the normally anticipated three sensors.

When an arcing fault occurs, the resulting high frequency components of the current flow induced in the secondary winding 22 enable the arc fault sensing circuit 32 to detect the occurrence of the arcing fault, as is well known in this art. The arcing fault detection circuit includes a processor programmed to analyze the second output signal, from the coil 42, and produce a trip signal in response to the detection of an arcing fault. One example of such an arcing fault detection circuit is described in U.S. Pat. No. 7,345,860, which is assigned to the assignee of the present invention.

The use of a single current sensor for the detection of arcing faults in a multiple-pole circuit breaker reduces the cost of the breaker by reducing the number of components required and also simplifying the assembly operations. The size of the circuit breaker can also be reduced, which leads to further cost reductions and marketing advantages.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A multi-pole circuit breaker for a power distribution system having multiple line conductors carrying AC currents that are out of phase with each other from a source to a load, comprising
    a first current sensor adapted to be coupled to both of said line conductors and to said neutral conductor and producing a first output signal indicative of the sum of the electrical currents flowing in said line conductors from source to load,
    a ground fault detection circuit receiving said first output signal and producing a trip signal in response to the detection of a ground fault,
    a second current sensor comprising a coil wound on a hollow core with both of said line conductors passing through said hollow core in a manner that the electrical currents in said line conductors induce in said coil a second output signal that is a function of the difference of the electrical currents in said line conductors, and an arcing fault detection circuit receiving said second output signal and including a processor programmed to analyze said second output signal and produce a trip signal in response to the detection of an arcing fault.

2. The multi-pole circuit breaker of claim 1 which has only two poles and two line conductors carrying AC currents that are 180° out of phase with each other.

3. The multi-pole circuit breaker of claim 2 in which said line conductors are part of a three-wire, single-phase, 120V-to-neutral, 240V-line-to-line, AC power distribution system.

4. The multi-pole circuit breaker of claim 1 which includes a controllable pair of contacts in each of said multiple line conductors, and a single trip mechanism coupled to all of said controllable pairs of contacts and responsive to said trip signals for controlling the opening of said contacts.

5. The multi-pole circuit breaker of claim 4 which said trip mechanism includes a solenoid having an armature coupled to each said controllable pair of contacts.

6. The multi-pole circuit breaker of claim 1 which said second current sensor is a di/dt sensor.

7. A multi-pole circuit breaker for a power distribution system having multiple line conductors carrying AC currents that are out of phase with each other from a source to a load, and a common neutral conductor, comprising a first current sensor adapted to be coupled to both of said line conductors and to said neutral conductor and producing a first output signal indicative of the sum of the electrical currents flowing in said line and neutral conductors from source to load, a ground fault detection circuit receiving said first output signal and producing a trip signal in response to the detection of a ground fault, a second current sensor comprising a coil wound on a hollow core having first and second open ends on opposite sides thereof, segments of said line conductors passing through said hollow core with the load end of a first one of said line conductor segments that pass through said hollow core located at said first open end, the load end of a second one of said line conductor segments that pass through said hollow core located at said second open end, the source end of said first line conductor segment located at said second open end, and the source end of said second line conductor segment located at said first open end said line conductors so that said core is coupled to both of said line conductors in a manner that the electrical currents in said line conductors flow in opposite directions inside said hollow core and thus inducing in said coil a second output signal that is a function of the difference of the electrical currents in said line conductors, and an arcing fault detection circuit receiving said second output signal and including a processor programmed to analyze said second output signal and produce a trip signal in response to the detection of an arcing fault.

8. The multi-pole circuit breaker of claim 7 which has only two poles and two line conductors carrying AC currents that are 180° out of phase with each other.

9. The multi-pole circuit breaker of claim 8 in which said line conductors are part of a three-wire, single-phase, 120V-to-neutral, 240V-line-to-line, AC power distribution system.

10. The multi-pole circuit breaker of claim 7 which includes a controllable pair of contacts in each of said multiple line conductors, and a trip mechanism coupled to each said controllable pair of contacts and responsive to said trip signals for controlling the opening of said contacts.

11. The multi-pole circuit breaker of claim 10 which said trip mechanism includes a solenoid having an armature coupled to each said controllable pair of contacts.

12. The multi-pole circuit breaker of claim 7 which said second current sensor is a di/dt sensor.

\* \* \* \* \*